United States Patent
Kobayashi et al.

(10) Patent No.: US 12,397,910 B2
(45) Date of Patent: Aug. 26, 2025

(54) FLIGHT EFFICIENCY IMPROVING SYSTEM FOR COMPOUND HELICOPTER

(71) Applicants: SUBARU CORPORATION, Tokyo (JP); Japan Aerospace Exploration Agency, Chofu (JP)

(72) Inventors: Wataru Kobayashi, Tokyo (JP); Hirotaka Hayashi, Tokyo (JP); Mizuki Nakamura, Tokyo (JP); Masafumi Sasaki, Tokyo (JP); Yasutada Tanabe, Chofu (JP); Noboru Kobiki, Chofu (JP)

(73) Assignees: SUBARU CORPORATION, Tokyo (JP); Japan Aerospace Exploration Agency, Tokyo (JP)

(*) Notice: Subject to any disclaimer, the term of this patent is extended or adjusted under 35 U.S.C. 154(b) by 53 days.

(21) Appl. No.: 17/334,285

(22) Filed: May 28, 2021

(65) Prior Publication Data
US 2021/0371091 A1 Dec. 2, 2021

(30) Foreign Application Priority Data

Jun. 1, 2020 (JP) .................... 2020-095177

(51) Int. Cl.
*B64C 27/26* (2006.01)
*B64C 3/10* (2006.01)
*B64C 39/00* (2023.01)

(52) U.S. Cl.
CPC ............. *B64C 27/26* (2013.01); *B64C 3/10* (2013.01); *B64C 39/029* (2020.01)

(58) Field of Classification Search
CPC .................................................... B64C 27/26
See application file for complete search history.

(56) References Cited

U.S. PATENT DOCUMENTS 1,993,701 A * 3/1935 Avery .................... B64C 27/26
  416/34
2011/0272519 A1* 11/2011 Challis .................. B64C 27/26
  244/6

(Continued)

FOREIGN PATENT DOCUMENTS

DE  10 2012 003 488 A1  8/2013
JP  H03-121996 A  5/1991
JP  H10181694 A *  7/1998

OTHER PUBLICATIONS

Extended European Search Report issued Oct. 21, 2021 for European Patent Application No. 21175987.3-1010.

(Continued)

*Primary Examiner* — Ashesh Dangol
(74) *Attorney, Agent, or Firm* — MCGINN I.P. LAW GROUP, PLLC (57) ABSTRACT

Provided is a flight efficiency improving system for a compound helicopter with a rotor and fixed wings. In forward flight of the compound helicopter, the flight efficiency improving system does not perform a cyclic pitch control of the rotor so as to allow a difference in lift generated by the rotor between an advancing side and a retreating side of the rotor, or the flight efficiency improving system performs the cyclic pitch control to an extent that does not completely eliminate the difference. The fixed wings are provided respectively on left and right sides of a body and are asymmetric to each other so that influence of an aerodynamic interference between the rotor and the fixed wings is reduced.

17 Claims, 7 Drawing Sheets

(56) References Cited

U.S. PATENT DOCUMENTS

2014/0084105 A1    3/2014  Eglin
2017/0113793 A1*   4/2017  Toulmay ................. B64C 27/22

OTHER PUBLICATIONS

Tanabe, Y. (Feb. 2019), "Aviation New Field Creation Program: Innovative Rotorcraft Technology", in Aviation Engineering, No. 767, pp. 30 40, Japan Aeronautical Engineers' Association.
Japanese Office Action, dated Dec. 19, 2023 in Japanese Application No. 2020-095177 and English translation thereof.
Japanese Office Action, dated May 28, 2024 in Japanese Office Action 2020-095177 and English Translation thereof.
Japanese Office Action in JPA No. 2020-095177 issued on Nov. 12, 2024 with English translation thereof.
Proceedings of Aircraft Symposium 57, p. 1, 2019 with English abstract and Use the above English translation of the Office Action as the concise explanation.

* cited by examiner

FLIGHT EFFICIENCY IMPROVING SYSTEM FOR COMPOUND HELICOPTER

CROSS-REFERENCE TO RELATED APPLICATIONS

This application is based upon and claims the benefit of priority under the Paris Convention of Japanese Patent Application No. 2020-095177 filed on Jun. 1, 2020, the entire disclosure of which, including the specification, claims, drawings and abstract, is incorporated herein by reference in its entirety.

BACKGROUND

The present disclosure relates to a flight efficiency improving system for a compound helicopter with a rotor and fixed wings.

A lot of research has been conducted on a compound helicopter with a rotor and fixed wings on the both sides of the body (for example, see JPH03-121996A).

Lift that supports the weight of the compound helicopter is generated by the rotor in hovering, while in forward flight it is generated by the fixed wings as well as the rotor.

Various types of compound helicopters have been introduced thus far. Some compound helicopters use part of the lift by the rotor as thrust by tilting forward, and others gain thrust from a propeller or a jet engine on the body or the fixed wings in forward flight (for example, see TANABE, Y. (February 2019), "Aviation New Field Creation Program: Innovative Rotorcraft Technology", in Aviation Engineering, No. 767, pp. 30-40, Japan Aeronautical Engineers' Association).

SUMMARY

An aspect of the present disclosure provides a flight efficiency improving system for a compound helicopter with a rotor and fixed wings.

In forward flight of the compound helicopter, the flight efficiency improving system does not perform a cyclic pitch control of the rotor so as to allow a difference in lift generated by the rotor between an advancing side and a retreating side of the rotor, or the flight efficiency improving system performs the cyclic pitch control to an extent that does not completely eliminate the difference.

The fixed wings are provided respectively on left and right sides of a body and are asymmetric to each other so that influence of an aerodynamic interference between the rotor and the fixed wings is reduced.

BRIEF DESCRIPTION OF DRAWINGS

The accompanying drawings are not intended as a definition of the limits of the disclosure but illustrate embodiments of the disclosure, and together with the general description given above and the detailed description of the embodiments given below, serve to explain the principles of the disclosure, wherein.

DETAILED DESCRIPTION OF EMBODIMENTS

As described in Background, in a compound helicopter, lift is provided by both a rotor and fixed wings in forward flight. However, being affected by the aerodynamic interference (downwash) from the rotor, the aerodynamic performance of the fixed wings is reduced from its optimal (that is, lift is decreased and drag is increased).

A brief explanation is shown below regarding this point.

Figure 10A:
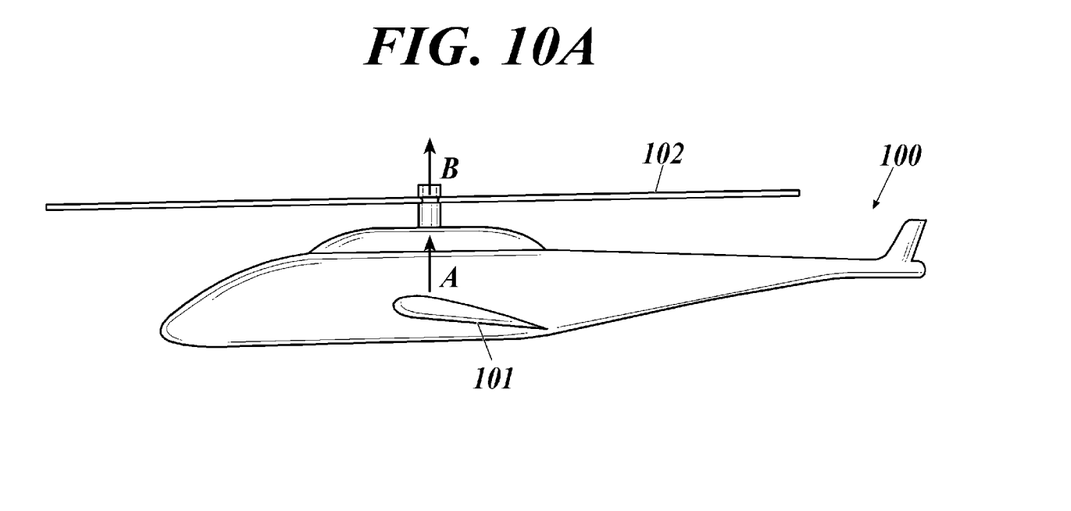
FIG. 10A shows lift generated by fixed wings and a rotor in a conventional compound helicopter.

For example, assume that a fixed wing 101 can generate lift A with its optimal aerodynamic performance and that a rotor 102 can generate lift B with its optimal in a compound helicopter 100, as shown in FIG. 10A.

Figure 10B:
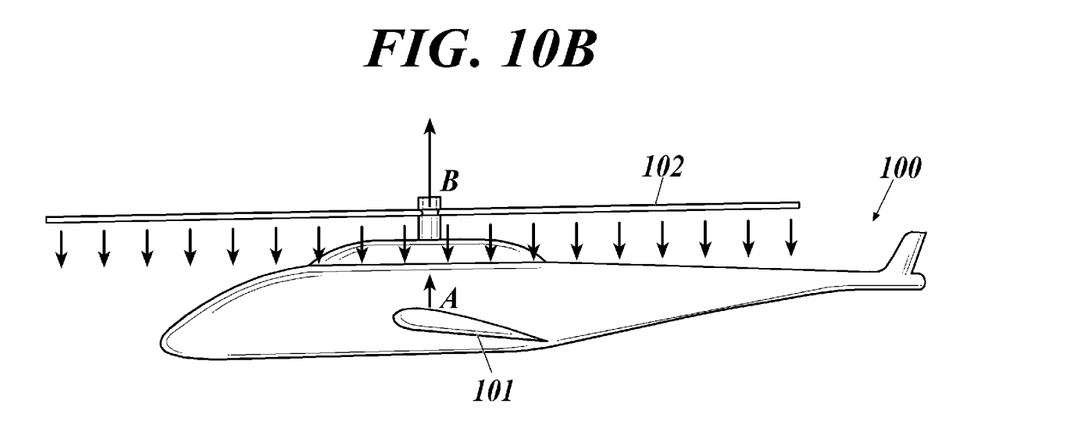
FIG. 10B is an explanatory drawing showing that lift by the fixed wings is reduced by downwash from the rotor, requiring greater lift by the rotor.

When the rotor 102 is rotated in the compound helicopter 100, downwash is caused by rotation of the rotor 102 toward the fixed wing 101, as shown in FIG. 10B.

Then, though in reality various phenomena are intricately involved, the downwash from the rotor 102 generates turbulence in the airflow on the upper surface side of the fixed wing 101, to put it simply.

As drag is increased along with a decrease in the lift A of the fixed wing 101 (that is, the aerodynamic performance of the fixed wing 101 is reduced from its optimal), a lift-drag ratio of the entire airframe is reduced.

In order to compensate for a decrease in the lift A of the fixed wing 101, the lift B of the rotor 102 need to be increased as shown in FIG. 10B, which requires additional power.

As shown above, in a conventional compound helicopter, the flight efficiency of the entire airframe is reduced as additional power is required in the rotor due to a reduction in the lift-drag ratio (L/D) of the entire airframe.

The present disclosure has been conceived in view of the above, and has an object of providing a flight efficiency improving system for a compound helicopter, which can improve efficiency in forward flight in a compound helicopter with a rotor and fixed wings.

Hereinafter, one or more embodiments of the flight efficiency improving system for the compound helicopter according to the present disclosure are described with reference to the drawings. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

The up-down, front-back, and left-right directions are described according to the respective directions in the compound helicopter.

Figure 1:
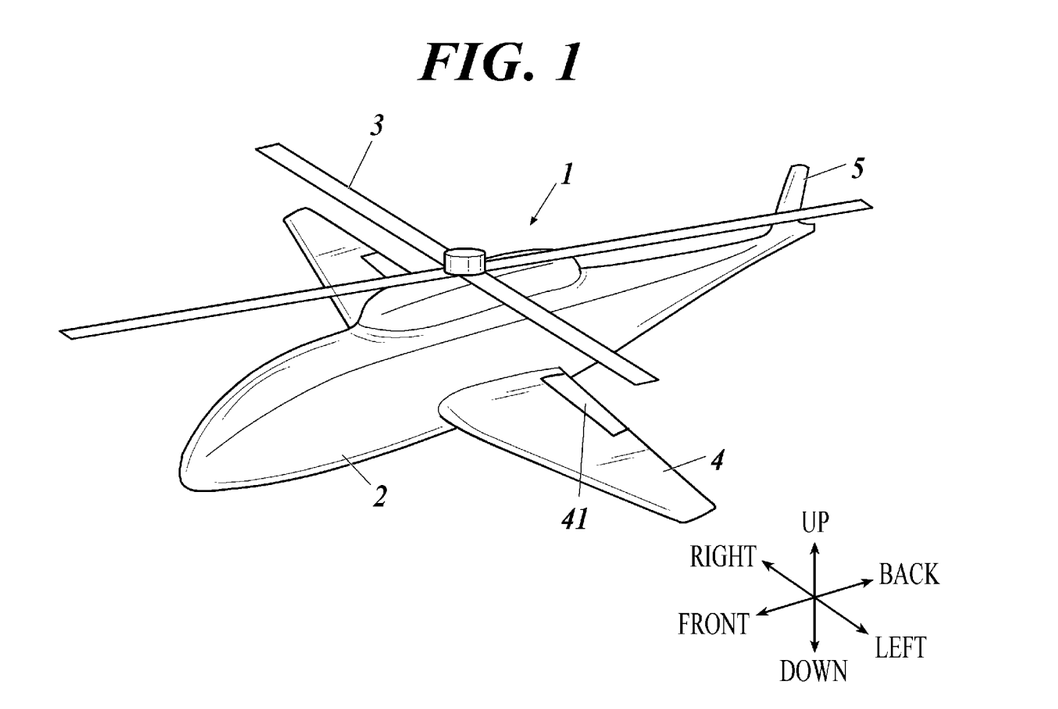
FIG. 1 shows an example of a compound helicopter according to an embodiment.

FIG. 1 shows an exemplary configuration of the compound helicopter in the present embodiment.

The compound helicopter 1 mainly includes a body 2, a rotor 3, fixed wings 4, and a vertical stabilizer 5. Though not shown in the drawings, a propulsion system such as a propeller and a jet engine may be provided on the body 2 (on its front, rear, or side), the fixed wings 4, or the like, and a tail rotor or the like may also be provided.

The number of blades of the rotor 3 of the compound helicopter 1 is not limited to four as in FIG. 1.

In the present embodiment, the fixed wings 4 are provided on the left and right of the body 2, and flaps 41 are respectively provided on the fixed wings 4. Though not shown in the drawings, an aileron or the like is provided on the fixed wings 4, and a rudder is provided on the vertical stabilizer 5.

[Problems in Deterioration of Aerodynamic Performance in Compound Helicopter]

As a result of repeated studies on deterioration of the flight efficiency of the entire airframe due to downwash (aerodynamic interference) from the rotor 3 in forward flight in the compound helicopter as described above, the inventors of the present disclosure have found that the problems shown below are involved in the deterioration.

Hereinafter, in the case where the rotor 3 rotates in a direction of a circular arrow α shown in FIG. 2 in forward flight of the compound helicopter, a blade of the rotor 3 moving in the same direction (toward the front) as the direction of forward flight of the compound helicopter is called an advancing blade 3A, and on the advancing side (the right side of the compound helicopter in this case), each blade of the rotor 3 are turned into the advancing blade 3A.

A blade of the rotor 3 moving in the opposite direction (toward the back) to the direction of forward flight of the compound helicopter is called a retreating blade 3B, and on the retreating side (the left side of the compound helicopter in this case), each blade of the rotor 3 are turned into the retreating blade 3B.

Therefore, each blade of the rotor 3 is cyclically moved from the advancing side to the retreating side along with rotation of the rotor 3 over and over.

Figure 2:
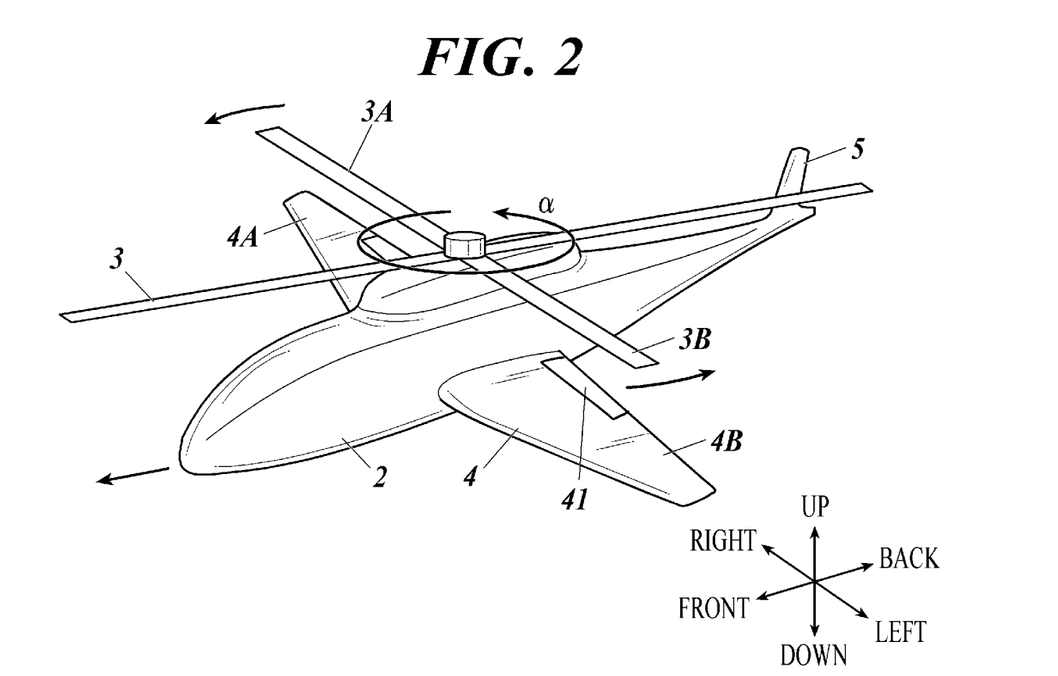
FIG. 2 shows a relation between a rotational direction and an advancing/retreating direction.

In the case where the rotor 3 rotates in the direction opposite to the arrow α shown in FIG. 2, the left side of the compound helicopter is the advancing side, and the right side of the helicopter is the retreating side.

[Cyclic Pitch Control]

Here, a cyclic pitch control of the rotor in a rotorcraft such as a compound helicopter is briefly explained in relation to Problem 1 described later.

As the advancing blade 3A of the rotor 3 is rotated forward against the airflow blown from the front along with forward flight of the rotorcraft, the wind speed of the airflow against the advancing blade 3A is relatively higher. On contrary, as the retreating blade 3B is rotated in the same direction as the airflow blown from the front, the wind speed of the airflow against the retreating blade 3B is relatively low.

If the pitches (angle of attach) of the advancing blade 3A and the retreating blade 3B are mostly consistent, lift is increased on the advancing side (in this case, the right side of the rotorcraft) and is decreased on the retreating side (in this case, the left side of the rotorcraft).

Figure 3A:
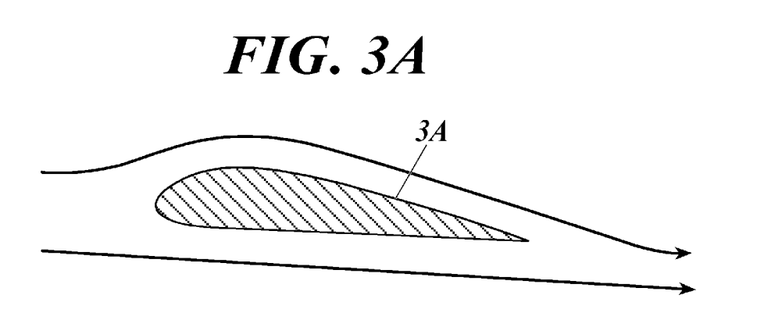
FIG. 3A shows an airflow around an advancing blade in a cyclic pitch control.
Figure 3B:
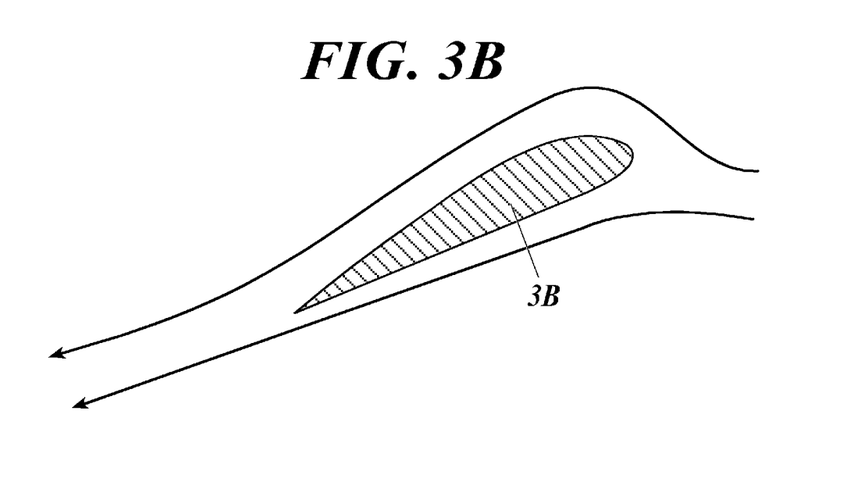
FIG. 3B shows an airflow around a retreating blade in the cyclic pitch control.

Thus, the cyclic pitch control is performed so that the pitch of the rotor 3 is decreased on the advancing side (3A) as shown in FIG. 3A, and is increased on the retreating side (3B) as shown in FIG. 3B, causing the lift to be approximately consistent on the advancing side and the retreating side of the rotorcraft.

The pitch of each blade of the rotary wing 3 cyclically repeats an increase and a decrease so that the pitch is the minimum on the advancing side and the maximum on the retreating side in one rotation. The arrows in FIGS. 3A and 3B represent airflows around the blades.

[Problem 1]

In the case where the cyclic pitch control is performed in the rotor 3 in forward flight of the compound helicopter or other rotorcrafts, the aerodynamic efficiency of the rotor 3 is reduced and the lift-drag ratio (L/D) of the rotor 3 is reduced compared to the case where the cyclic pitch control is not performed. Additional power is required in the rotor 3 to compensate for that.

Therefore, the cyclic pitch control of the rotor 3 in forward flight is a factor of reduction in the flight efficiency of the compound helicopter.

[Problem 2]

As described above, the aerodynamic interference on the fixed wings 4 caused by the downwash from the rotor 3 also reduces the flight efficiency of the compound helicopter.

That is, in the compound helicopter, as the rotor 3 is rotated in forward flight, the downwash toward the fixed wings 4 caused by rotation of the rotor 3 generates turbulence in the airflow on the upper surface side of the fixed wings 4. The drag is thereby increased along with the decrease in the lift by the fixed wings as a whole, a lift-drag ratio of the entire airframe is reduced. Additional power is required in the rotor 3 to compensate for it, and therefore the flight efficiency of the compound helicopter is reduced by the downwash from the rotor 3 in forward flight of the compound helicopter.

In that way, the aerodynamic interference on the fixed wings 4 caused by rotation of the rotor 3 in forward flight of the compound helicopter is also a factor of reduction in the flight efficiency of the compound helicopter.

As a result of detailed research, the present inventors have made the following findings.

Figure 4:
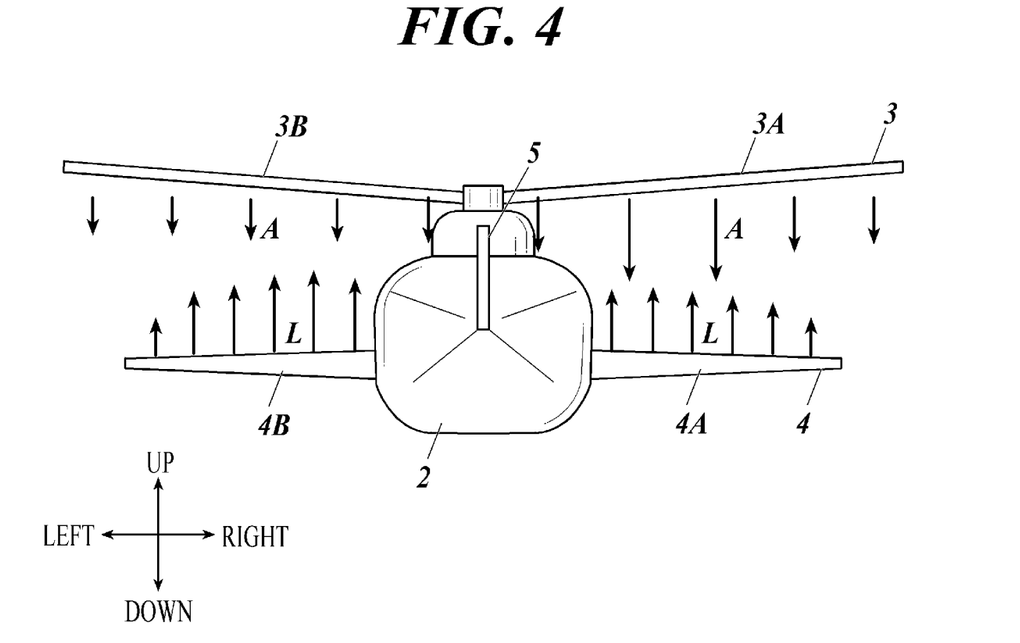
FIG. 4 is a back view a conventional compound helicopter and shows a magnitude of downwash from a rotor and a magnitude of lift generated by each of fixed wings on the left and right.

The present inventors have analyzed the aerodynamic interference caused by the downwash described above in detail, and found that the downwash A from the advancing blade 3A is greater than that from the retreating blade 3B, as shown in FIG. 4 viewed from the back, even in the case where the lift of the rotor 3 is adjusted so as to be mostly consistent on the advancing side and the retreating side by the cyclic pitch control of the rotor 3 as described above.

Refer to TANABE, Y. (February 2019), "Aviation New Field Creation Program: Innovative Rotorcraft Technology", in Aviation Engineering, No. 767, pp. 30-40, Japan Aeronautical Engineers' Association. in this regard.

The turbulence of the airflow caused by the downwash A from the rotor 3 on the upper surface side of the fixed wings 4 is greater on the advancing side than on the retreating side of the rotor 3, and lift L generated by the fixed wing 4A on the advancing side (in this case, the right side of the airframe) is smaller than that by the fixed wing 4B on the retreating side (in this case, the left side of the airframe).

In that way, the aerodynamic interference on the fixed wings 4 by the downwash generated by rotation of the rotor 3 affects more on the fixed wing 4A corresponding to the advancing blade 3A of the rotor 3 than on the fixed wing 4B corresponding to the retreating blade 3B of the rotor 3.

[Problem 3—Moment in Rolling Direction in Forward Flight]

As shown above, while studying the reduction in the flight efficiency of the compound helicopter in forward flight, the present inventors have experimentally found that a rolling moment is generated on the airframe in forward flight of the compound helicopter due to the influence of the aerodynamic interference described above.

This phenomenon is explained as follows.

Figure 5:
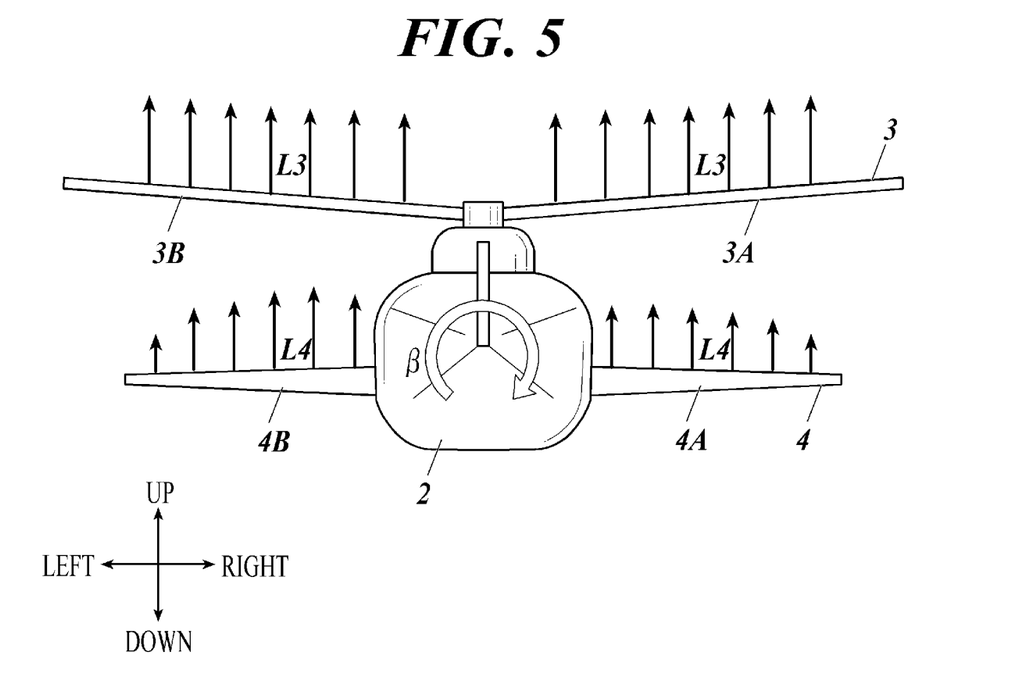
FIG. 5 is an explanatory drawing showing that lift of a fixed wing on the retreating side is greater due to an aerodynamic interference, producing a rolling moment in a conventional compound helicopter.

Consequently, lift L4 generated by the fixed wing 4B is greater than that by the fixed wing 4A on the advancing side as shown in FIG. 5, affected by the aerodynamic interference on the fixed wings 4 caused by the downwash generated by rotation of the rotor 3 as described above.

The cyclic pitch control of the rotor 3 is then performed so that lift L3 of the rotor 3 is consistent on the advancing side and on the retreating side.

A rolling moment $\beta$ (see the circular arrow $\beta$ in FIG. 5) is generated such that the entire airframe is raised on the retreating side and lowered on the advancing side of the rotor 3, as shown in FIG. 5.

In this phenomenon, the moment $\beta$ is varied depending on the flight state such as the flight speed of the compound helicopter or the rotation speed of the rotor 3. Thus, in order to keep the attitude in forward flight, it is necessary for the pilot to make corrections in maneuvers according to the flight state.

[Configuration of Flight Efficiency Improving System for Compound Helicopter 1]

In order to deal with the above problems, the flight efficiency improving system for the compound helicopter according to the present disclosure is configured as follows.

[Configuration as Countermeasure for Problem 1]

In the present embodiment, concerning Problem 1, the cyclic pitch control of the rotor 3 in forward flight of the compound helicopter 1 is not performed so as to allow a difference in the lift L3 generated by the rotor 3 between the advancing side and the retreating side of the rotor 3, or performed to an extent that does not completely eliminate the difference in the lift L3 generated by the rotor 3 between the advancing side and the retreating side.

In a configuration according to the present embodiment, in forward flight of the compound helicopter 1, the operation amount of the cyclic pitch control of the rotor 3 is reduced from the usual amount (or not performed) as the angle of attack of the retreating blade 3B of the rotor 3 is reduced from the case where the usual cyclic pitch control of the rotor 3 is performed (where the lift L3 is almost consistent on the advancing side and on the retreating side).

As already described as Problem 1, in the case where the cyclic pitch control is performed in the rotor 3 in forward flight of the compound helicopter, the aerodynamic efficiency of the rotor 3 is reduced and the lift-drag ratio (L/D) of the rotor 3 is reduced compared to the case where the cyclic pitch control is not performed. Additional power is required in the rotor 3 to compensate for that.

However, in the configuration according to the present invention, the operation amount of the cyclic pitch control is reduced from the usual amount, the additional power required by the cyclic pitch control in the rotor 3 is reduced or canceled, and the flight efficiency of the compound helicopter 1 can be improved accordingly. The flight efficiency in forward flight is improved in the compound helicopter 1 as described above.

In the configuration described above, a difference in the lift L3 is allowed between the advancing side and the retreating side of the rotor 3, and the lift L3 generated by the rotor 3 on the advancing side is greater than the lift L3 generated on the retreating side, to which explanation is given later.

[Configuration as Countermeasure for Problem 2]

On the other hand, in the present embodiment, regarding the aerodynamic interference on the fixed wings 4 by the downwash from the rotor 3 in Problem 2, the fixed wings 4A and 4B on the left and right are asymmetric 0 so as to reduce the influence of the aerodynamic interference between the rotor 3 and the fixed wings 4.

As the fixed wings 4A and 4B on the left and right are asymmetric so as to reduce the influence of the aerodynamic interference between the rotor 3 and the fixed wings 4, the decrease in the lift L4 of the fixed wings 4 due to the downwash from the rotor 3 is alleviated. The aerodynamic performance of the fixed wings 4 then approaches its optimal.

The additional power required to compensate for the decrease in the lift L4 of the fixed wings 4 can be suppressed, and the flight efficiency of the compound helicopter 1 can be improved accordingly.

The flight efficiency in forward flight is improved in the compound helicopter 1 as described above.

As shown in FIG. 4, the interference on the fixed wings 4 by the downwash generated by rotation of the rotor 3 affects more on the fixed wing 4A corresponding to the advancing blade 3A of the rotor 3 (the left side of the aircraft in FIG. 4) than on the fixed wing 4B corresponding to the retreating blade 3B of the rotor 3 (the right side of the aircraft in FIG. 4).

Therefore, in the present embodiment, the fixed wings 4A and 4B are asymmetrical so that the fixed wing 4A on the advancing side is less susceptible to the interference by the downwash from the rotor 3. Hereinafter, exemplary configurations are described in detail.

Figure 6A:
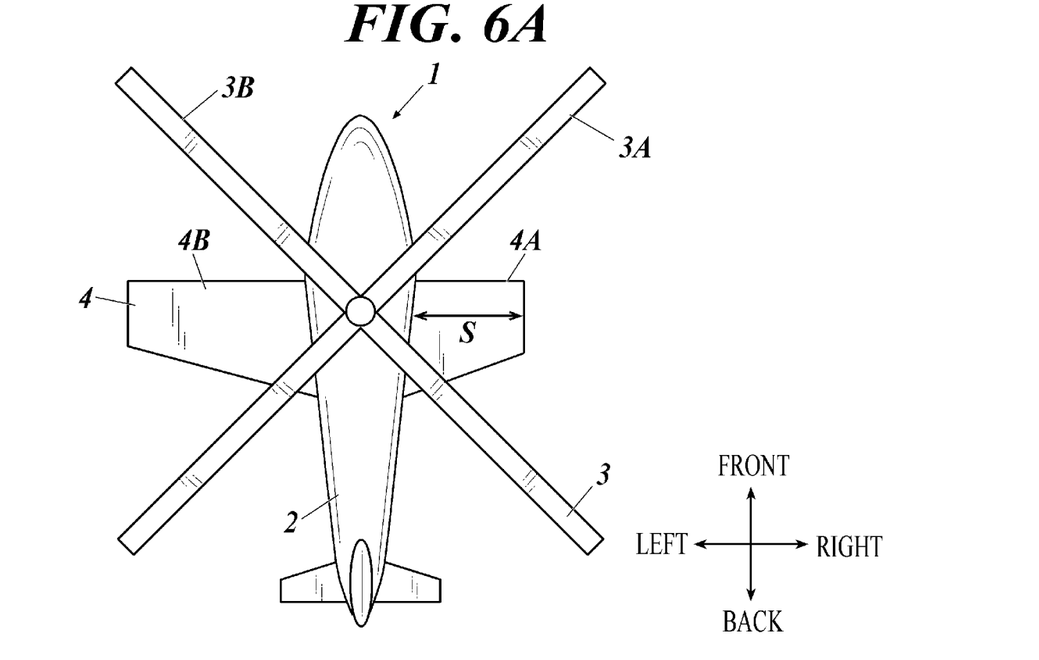
FIG. 6A shows an exemplary configuration 1 of a fixed wing on the advancing side in which a wingspan is shortened.

[Configuration 1] For example, as shown in FIG. 6A, the fixed wing 4A on the advancing side of the fixed wings 4 on the left and right of the body 2 of the compound helicopter 1 may be formed to have a smaller length S in the wingspan direction than the fixed wing 4B on the retreating side of the fixed wings 4, and the fixed wings 4A and 4B on the left and right have lengths S in the wingspan direction different from each other.

With that configuration, the fixed wing 4A on the advancing side has a smaller area than the fixed wing 4B on the retreating side, and the fixed wing 4A is less susceptible to the aerodynamic interference from the rotor 3.

[Exemplary Configuration 2]

Figure 6B:
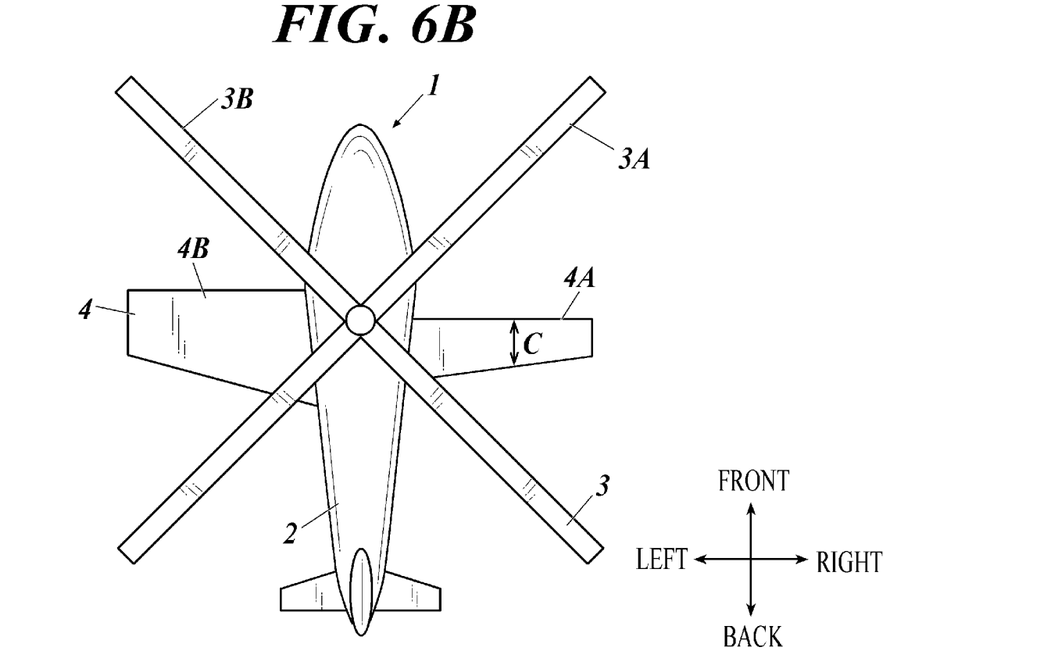
FIG. 6B is an exemplary configuration 2 of a fixed wing on the advancing side in which a wing cord is shortened.

For example, as shown in FIG. 6B, the fixed wing 4A on the advancing side may be formed to have a longer wing chord (chord length) than the fixed wing 4B on the retreating side, and the fixed wings 4A and 4B on the left and right have wing chords C different from each other.

Also with that configuration, the fixed wing 4A on the advancing side has a smaller area than the fixed wing 4B on the retreating side, and the fixed wing 4A is less susceptible to the aerodynamic interference from the rotor 3.

[Exemplary Configuration 3]

Figure 7A:
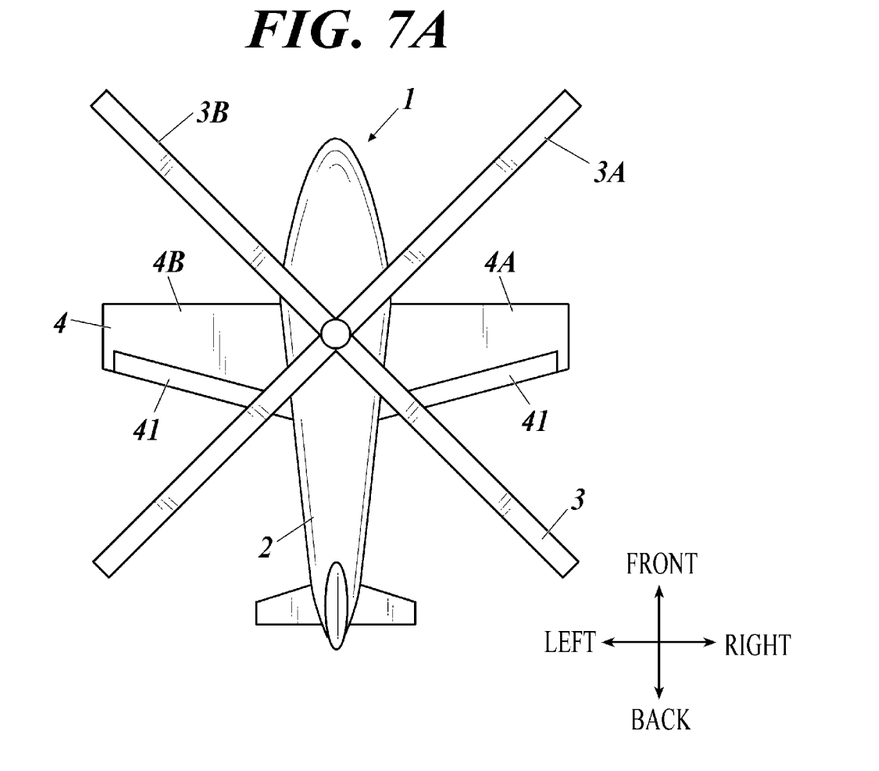
FIG. 7A is an exemplary configuration 3, in which airfoils are different between fixed wings on the advancing side and the retreating side.
Figure 7B:
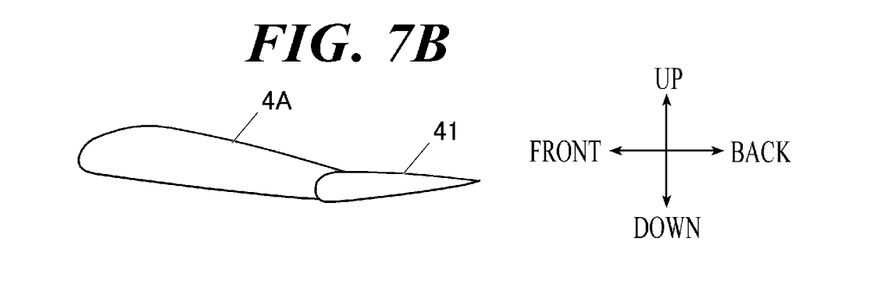
FIG. 7B shows the airfoil with a flap raised.
Figure 7C:
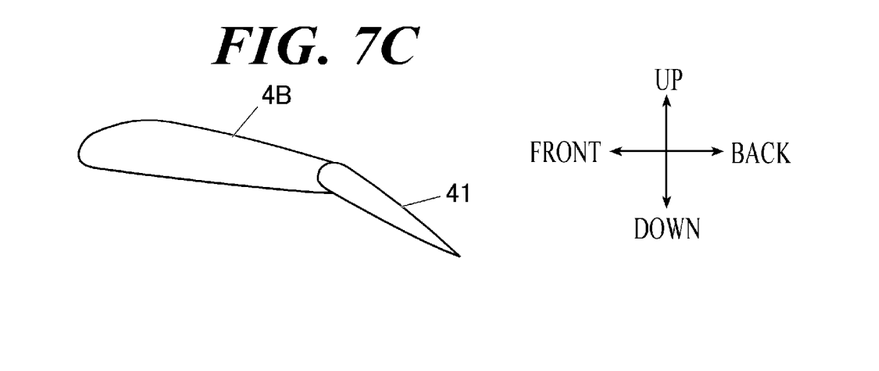
FIG. 7C shows the airfoil with a flap lowered.

For example, as shown in FIG. 7A, flaps 41 respectively provided on the fixed wings 4 on the left and right may be configured to be controlled such that the flap 41 on the fixed wing 4A on the advancing side is raised as shown in FIG. 7B and the flap 41 on the fixed wing 4B on the retreating side is lowered as shown in FIG. 7C, which makes the airfoils of the fixed wings 4A and 4B different from each other.

In that case, the airflow on the upper surface side of the fixed wing 4A gets faster with the flap 41 being lowered, but the downwash from the rotor 3 (see FIG. 4) causes the turbulence of the airflow to be harder, and the fixed wing 4A is more affected by the aerodynamic interference by the downwash from the rotor 3.

However, the airflow on the upper surface side of the fixed wing 4A gets slower with the flap 41 being raised as in Configuration 3. Thus, even when the airflow is turbulent due to the downwash from the rotor 3, the extent of the turbulence of the airflow is smaller than when the airflow is faster (with the flap 41 being lowered).

With Configuration 3, the fixed wing 4A is less susceptible to the aerodynamic interference caused by the downwash from the rotor 3.

Two or all of Configuration 1 to 3 can be combined with each other.

As the magnitude of the aerodynamic interference caused by the downwash from the rotor 3 is varied depending on the flight speed and the like of the compound helicopter 1, the length S in the wingspan direction (Configuration 1), the wing chord length C (Configuration 2), and the extent of raising the flaps 41 (airfoil in Configuration 3) may be changeable.

[Combination of Configurations as Countermeasures for Problems 1 and 2]

In the flight efficiency improving system for the compound helicopter in the present embodiment, it is possible to suppress the additional power required by the cyclic pitch control in the rotor 3 (countermeasure for Problem 1) and the additional power to compensate for the decrease in the lift L4 of the fixed wings 4 due to the aerodynamic interference on the fixed wings 4 of the downwash from the rotor 3 (countermeasure for Problem 2) by combining the configurations as the countermeasures for Problems 1 and 2.

The flight efficiency in forward flight of the compound helicopter 1 can be improved accordingly.

[Solution of Problem 3 in Above Configuration]

Figure 8:
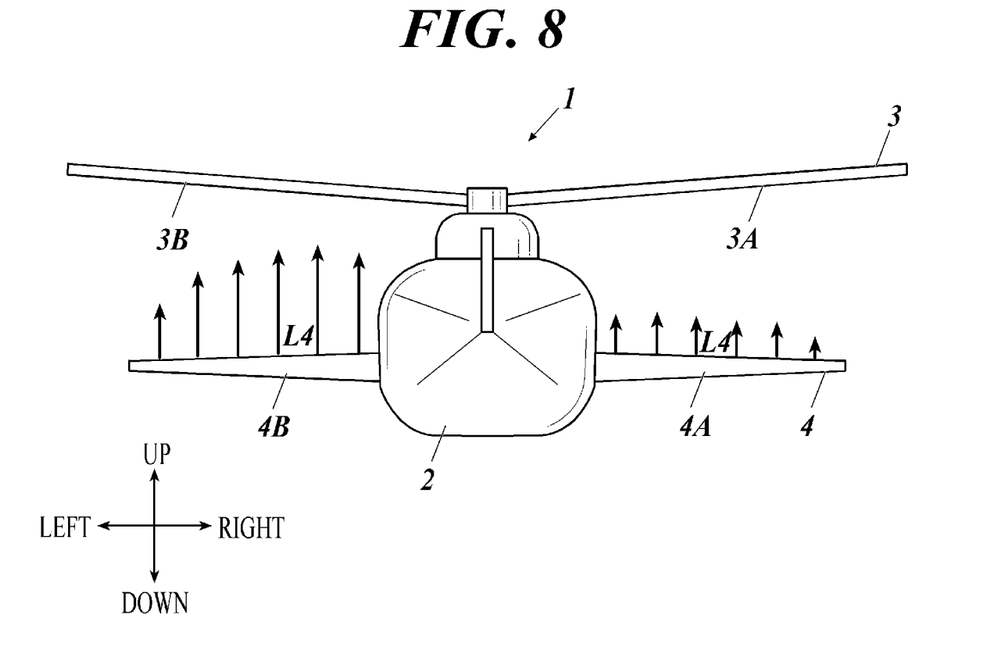
FIG. 8 shows a magnitude of lift generated by each of fixed wings on the advancing side and on the retreating side, with the fixed wings 4A and 4B on the right and left being asymmetric to each other.

In the present invention, as shown above as the countermeasure for Problem 1, as the fixed wings 4A and 4B on the left and right are asymmetric so as to reduce the influence of the aerodynamic interference between the rotor 3 and the fixed wings 4, the lift L4 generated by the fixed wing 4B on the retreating side is greater than the lift L4 generated by the fixed wing 4A on the advancing side in the compound helicopter 1 as shown in FIG. 8.

Figure 9:
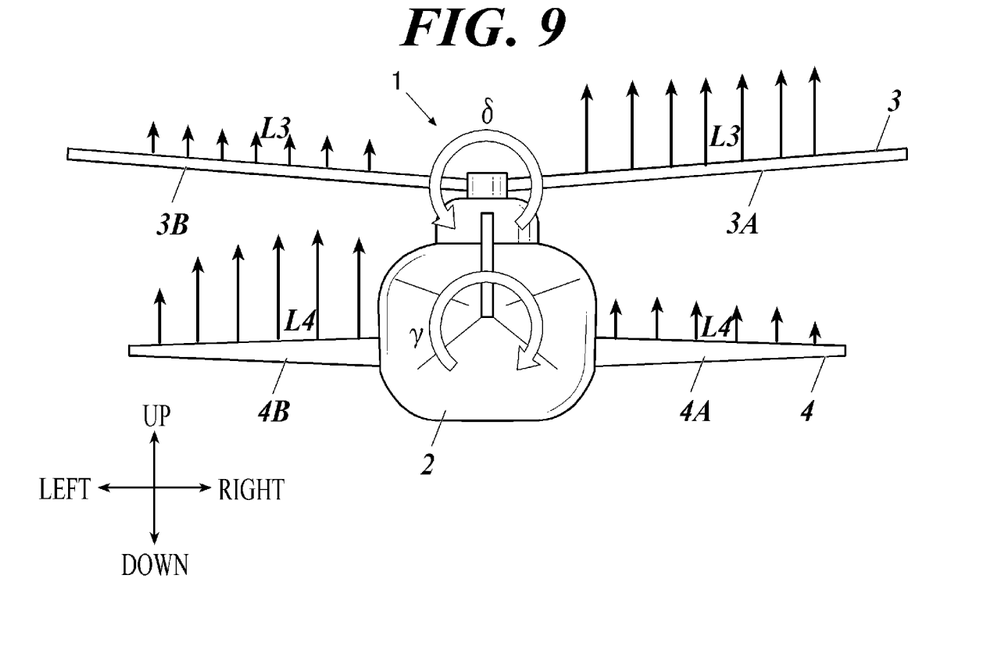
FIG. 9 is an explanatory drawing showing that a moment due to the lift generated by the fixed wings and a moment due to the lift generated by the rotor are in directions to cancel each other out.

Thus, in the present embodiment, in forward flight of the compound helicopter 1, a rolling moment (clockwise in FIG. 9) $\gamma$ is generated by the fixed wings 4A and 4B on the left and right in the airframe of the compound helicopter 1 as shown by the arrow $\gamma$ in FIG. 9.

On contrary, in the present invention, as shown above as the countermeasure for Problem 1, as the operation amount of the cyclic pitch control of the rotor 3 is reduced from the usual amount (or not performed) in forward flight of the compound helicopter 1, the lift L3 generated by the advancing blade 3A (the rotor 3 on the advancing side) is greater than the lift L3 generated by the retreating blade 3B (the rotor 3 on the retreating side) concerning the advancing and retreating blades 3A and 3B of the rotor 3 in the compound helicopter 1, as shown in FIG. 9.

Thus, in the present embodiment, in forward flight of the compound helicopter 1, a rolling moment (counterclockwise in FIG. 9) $\delta$ in the direction opposite to the rolling moment $\gamma$ is generated by the rotor 3 in the compound helicopter 1.

In the present embodiment, as described above, the rolling moment $\gamma$ due to the lift L4 generated by the fixed wings 4A and 4B and the rolling moment $\delta$ due to the lift L3 generated by the advancing blade 3A (the rotor 3 on the advancing side) and the retreating blade 3B (the rotor 3 on the retreating side) on the retreating side of the rotor 3 are in the opposite directions and cancel each other out.

Thus, as the operation amount of the cyclic pitch control of the rotor 3 is adjusted so that the moment $\delta$ is generated and cancels out the moment $\gamma$ generated by the asymmetric fixed wings 4 (namely, the moment $\delta$ of the same size with the moment $\gamma$ in the direction opposite to the moment $\gamma$), it is possible not to generate a rolling moment in the aircraft in forward flight of the compound helicopter 1, solving Problem 3 described above. Then, it is possible to keep the attitude of the compound helicopter 1 in forward flight without the pilot making corrections in maneuvers.

In other words, in the flight efficiency improving system for the compound helicopter 1 in the present embodiment, the fixed wings 4A and 4B on the left and right of the body 2 are different from each other in the length S in the wingspan, the wing chord length C, and/or the airfoil so that the rolling moment $\gamma$ due to the lift L4 generated by the fixed wings 4A and 4B on the left and right of the body 2 and the rolling moment $\delta$ due to the lift generated by the rotor 3 on the advancing side (the advancing blade 3A) and on the retreating side (the retreating blade 3B) cancel each other out, as shown in FIG. 9.

As described above, the moments $\gamma$ and $\delta$ are varied depending on the flight state such as the flight speed of the compound helicopter 1 or the rotation speed of the rotor 3.

Thus, as the operation amount of the cyclic pitch control of the rotor 3 may be adjusted according to the flight state such as the flight speed of the compound helicopter 1 and the rotation speed of the rotor 3, it is possible to maintain the state where the moments $\gamma$ and $\delta$ cancel each other out even when the flight state is varied.

As the lengths S in the wingspan direction, the wing chord length C, and the airfoils (the extent of raising the flap 41) of the fixed wings 4 (especially the fixed wing 4A on the advancing side) are changeable, it is possible to maintain the state where the moments $\gamma$ and $\delta$ are canceling each other out even in different flight states by suitably combining the adjustment of these parameters and the operation amount of the cyclic pitch control of the rotor 3.

Thus, it is possible to keep the attitude in forward flight of the compound helicopter 1 even in the case where the pilot does not make corrections in maneuvers.

Although some embodiments of the present disclosure have been described and illustrated, the disclosed embodiments are made for purposes of not limitation but illustration and example only, and modifications can be made as needed within the scope of the present disclosure.

What is claimed is:

1. A flight efficiency improving system for a compound helicopter comprising a rotor and fixed wings,
wherein while in forward flight of the compound helicopter, the flight efficiency improving system is configured to switch between not perform a cyclic pitch control of the rotor to allow a difference in lift generated by the rotor between an advancing side and a retreating side of the rotor, and to perform the cyclic pitch control to an extent that does not completely eliminate the difference, and
wherein the fixed wings are provided respectively on left and right sides of a body and are configured to be asymmetric to each other to reduce influence of an aerodynamic interference between the rotor and the fixed wings,
wherein the fixed wings on the left and right sides of the body are opposed to each other with the body interposed therebetween,
wherein the fixed wings on the left and right sides of the body are different from each other in at least one of length in a direction of wingspan, and length of a wing chord, the fixed wings being configured such that a rolling moment due to lift generated by the fixed wings on the left and right sides cancels out a rolling moment due to the lift generated by the rotor on the advancing side and the retreating side, and
wherein the compound helicopter is without a tail rotor.

2. The flight efficiency improving system for the compound helicopter according to claim 1,
wherein the fixed wings on the left and right sides of the body are asymmetric to each other so that lift generated by one of the fixed wings provided at the retreating side of the rotor is greater than lift generated by another of the fixed wings provided at the advancing side of the rotor.

3. The flight efficiency improving system for the compound helicopter according to claim 1,
wherein the compound helicopter is configured such that at least one of the length in the direction of the wingspan, and the length of the wing chord, is configured to be changeable.

4. The flight efficiency improving system for the compound helicopter according to claim 1, further comprising a controller that controls the cyclic pitch control,
wherein in the forward flight of the compound helicopter, the controller does not perform the cyclic pitch control of the rotor so as to allow the difference in the lift generated by the rotor between the advancing side and the retreating side of the rotor, or the controller performs the cyclic pitch control to an extent that does not completely eliminate the difference.

5. The flight efficiency improving system for the compound helicopter according to claim 1, wherein the fixed wings are below the rotor, and
wherein the cyclic pitch control is controlled by a processor to control the difference in the lift to be greater than zero.

6. The flight efficiency improving system for the compound helicopter according to claim 1, wherein the fixed wings are adjacent to and below the rotor, and
wherein the cyclic pitch control is controlled by a processor to control the difference in the lift to be greater than zero.

7. The flight efficiency improving system for the compound helicopter according to claim 1, wherein the fixed wings are asymmetric and secured in a position below the rotor.

8. The flight efficiency improving system for the compound helicopter according to claim 1, wherein the fixed wings are not adjacent to a tail of the compound helicopter, and
wherein the rotor generates the lift for the compound helicopter.

9. The flight efficiency improving system for the compound helicopter according to claim 1, wherein in the forward flight of the compound helicopter, the flight efficiency improving system is configured to allow the difference in the lift generated by the rotor between the advancing side and the retreating side of the rotor due to mostly consistent pitches of an advancing blade and a retreating blade of the rotor, or the flight efficiency improving system performs the cyclic pitch control to an extent that does not completely eliminate the difference.

10. The flight efficiency improving system for the compound helicopter according to claim 9,
wherein the fixed wings on the left and right sides of the body are different from each other in the length in the direction of wingspan and/or in the length of the wing chord so that the rolling moment due to the lift generated by the fixed wings on the left and right sides cancels out the rolling moment due to the lift generated by the rotor on the advancing side and the retreating side.

11. The flight efficiency improving system for the compound helicopter according to claim 1, wherein the fixed wings are primary wings different from tail wings,
wherein the fixed wings are disposed at corresponding locations on the left and right sides of the body.

12. A compound helicopter comprising:
the body, the rotor, the fixed wings, and the flight efficiency improving system according to claim 1.

13. The flight efficiency improving system according to claim 1,
wherein an operation amount of the cyclic pitch control of the rotor is adjusted such that the rolling moment is generated which cancels out the rolling moment generated by the asymmetric fixed wings.

14. A flight efficiency improving system for a compound helicopter with a rotor and fixed wings, the flight efficiency improving system including a controller, configured to:
while in forward flight of the compound helicopter, switch between not performing a cyclic pitch control of the rotor so as to allow a difference in lift generated by the rotor between an advancing side and a retreating side of the rotor, and performing the cyclic pitch control to an extent that does not completely eliminate the difference,
wherein the fixed wings are provided below the rotor and respectively on left and right sides of a body and are asymmetric to each other so that influence of an aerodynamic interference between the rotor and the fixed wings is reduced,
wherein the fixed wings on the left and right sides of the body are opposed to each other with the body interposed therebetween,
wherein the fixed wings on the left and right sides of the body are different from each other in at least one of length in a direction of wingspan, and length of a wing chord such that a rolling moment due to lift generated by the fixed wings on the left and right sides cancels out a rolling moment due to the lift generated by the rotor on the advancing side and the retreating side, and wherein the compound helicopter is without a tail rotor.

15. The flight efficiency improving system for the compound helicopter according to claim 14, wherein the fixed wings on the left and right sides of the body are asymmetric to each other so that lift generated by one of the fixed wings provided at the retreating side of the rotor is greater than lift generated by another of the fixed wings provided at the advancing side of the rotor.

16. The flight efficiency improving system for the compound helicopter according to claim 14, wherein the compound helicopter is configured such that at least one of the length in the direction of the wingspan, and the length of the wing chord is configured to be changeable.

17. The flight efficiency improving system for the compound helicopter according to claim 14, wherein in the forward flight of the compound helicopter, the flight efficiency improving system is configured to allow the difference in the lift generated by the rotor between the advancing side and the retreating side of the rotor due to mostly consistent pitches of an advancing blade and a retreating blade of the rotor, or the flight efficiency improving system performs the cyclic pitch control to an extent that does not completely eliminate the difference, and wherein the fixed wings on the left and right sides of the body are different from each other in the length in the direction of wingspan and/or in the length of the wing chord so that the rolling moment due to the lift generated by the fixed wings on the left and right sides cancels out the rolling moment due to in the lift generated by the rotor on the advancing side and the retreating side.

* * * * *